Nov. 14, 1939.    C. H. PETSKEYES    2,179,798
LOAF TRANSFER
Filed May 6, 1936
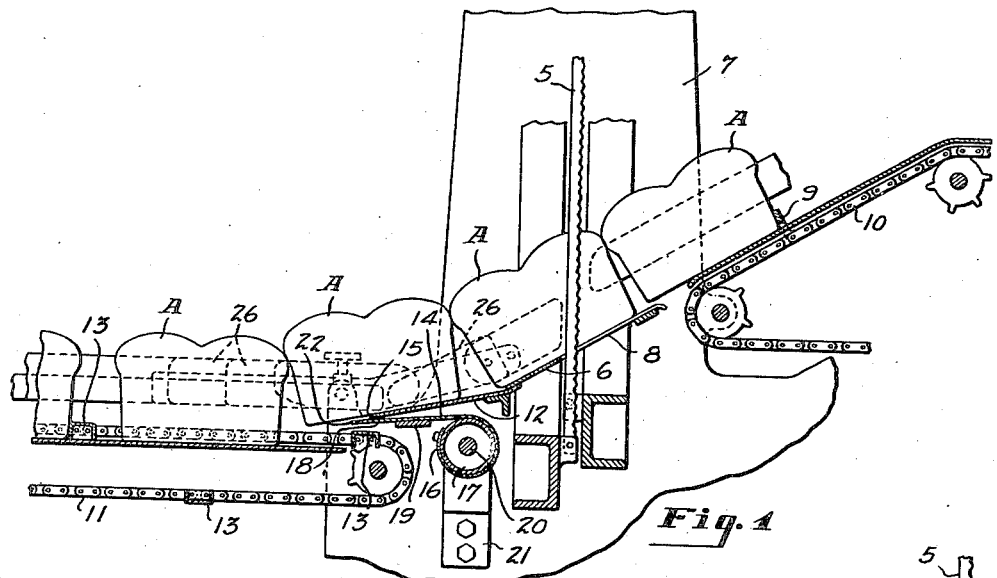
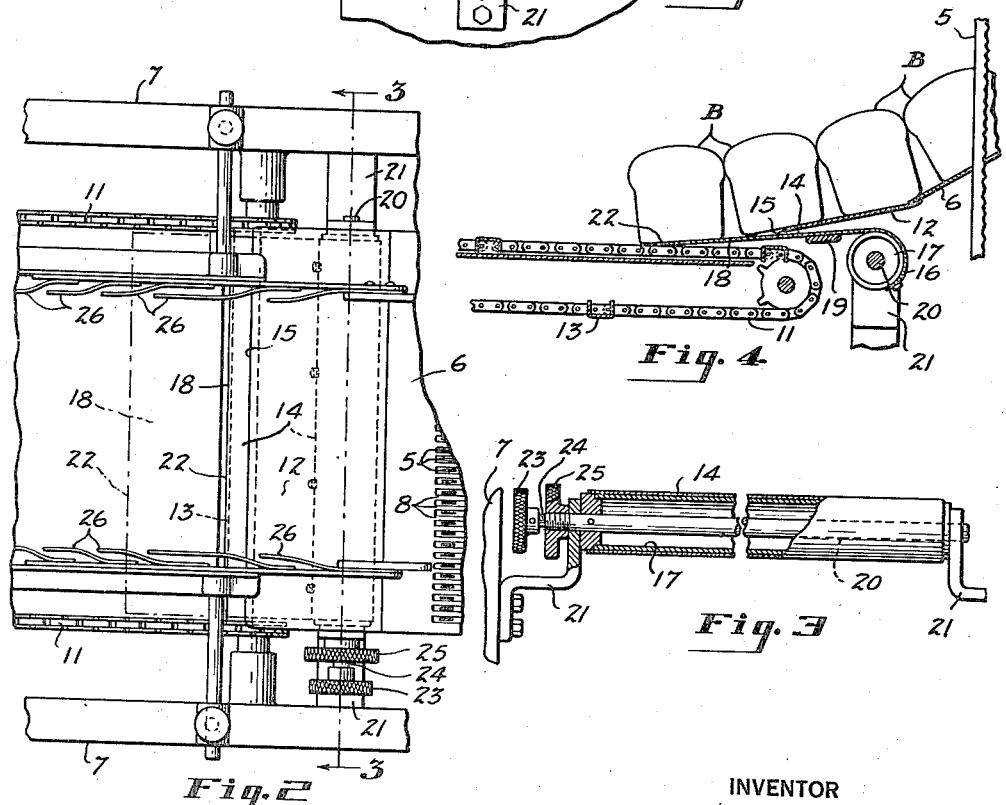
INVENTOR
Charles H. Petskeyes
BY Evans & McCoy
ATTORNEYS Patented Nov. 14, 1939

2,179,798

UNITED STATES PATENT OFFICE 2,179,798

LOAF TRANSFER

Charles H. Petskeyes, Davenport, Iowa, assignor to Micro-Westco, Inc., Bettendorf, Iowa, a corporation of Delaware Application May 6, 1936, Serial No. 78,114

12 Claims. (Cl. 146—153)

This invention relates to bread slicing and bread wrapping machines, and particularly to the means for transferring sliced loaves from the slicing machine to the wrapping machine.

In the commercial slicing of bread it frequently happens that batches of different size loaves of bread are successively run through the slicing and wrapping machines. It is desirable to provide means for adjustably timing the discharge of sliced loaves of different sizes from the slicing machine to the discharge conveyor of the slicing machine, so that each loaf will be properly positioned on the infeed conveyor of a wrapper or other machine.

It is, therefore, one of the objects of this invention to provide new and improved means for supporting the loaves of bread as they leave the slicing mechanism to properly position the sliced loaves on the discharge conveyor of the slicing machine.

Another object is to provide a bread slicing machine discharge which is adjustable, so that successive loaves leaving the slicing machine will be individually positioned between successive flights on the discharge conveyor.

A further object is to provide a discharge means of this character which can be adjusted while the slicing machine is in continuous operation.

A still further object is to provide a simple and efficient discharge means that will occupy a minimum of space.

With the above and other objects in view, which will be apparent from the following description, the present invention consists of certain features of construction and combinations of parts.

Referring to the drawing which illustrates a suitable embodiment of the invention, Figure 1 is a fragmentary side elevation in section of one type of slicing machine to which the apparatus of the present invention may be applied;

Fig. 2 is a fragmentary plan view of the structure shown in Fig. 1;

Fig. 3 is a section on the line 3—3 of Fig. 2; and

Fig. 4 is a fragmentary detail of Fig. 1 showing the device of the present invention adjusted to transfer single loaves.

Referring to the drawing by numerals of reference, the slicing machine illustrated as being one type to which the apparatus of the present invention may be applied is of the reciprocal blade type in which a plurality of cutters 5 are arranged to reciprocate in a vertical direction, the bread "A" or other baked article being sliced, is supported during the slicing operation by means of a transfer plate 6 secured to the side frames 7 of the slicer and having a plurality of finger portions 8 between which the cutters 5 reciprocate.

The loaves A may be propelled over the transfer plate 6 and through the slicing mechanism by the flights 9 of the slicer feed conveyor 10. The conveyor 11 is the discharge conveyor of the slicing machine and may lead to the infeed conveyor of a wrapping machine or if the wrapping machine is built in combination with the slicing machine the conveyor 11 may itself be the infeed conveyor of the wrapper. The conveyor 11 is positioned under the discharge plate 12 of the slicing machine, and by suitable mechanism (not shown) the feed conveyor 10 and the conveyor 11 are synchronously operated so that the loaves A will be discharged one at a time from the plate 12 onto the conveyor 11 and between successive flights 13 thereof.

In order that loaves of different widths may be handled by the slicing and wrapping machine working on coordination in such a way that the loaves will be properly deposited upon the infeed conveyor of the wrapping machine, the present invention provides a loaf transfer apron 14 which is extendible beyond the edge 15 of the discharge plate 12 so that successive sliced loaves can be dropped off the discharge plate 12 onto the conveyor 11 in various predetermined positions relative to the flights 13. The loaf transfer apron 14 is of a flexible material such as sheet metal. It has one end 16 anchored or secured to the roller 17. The loaf supporting portion 18 of the apron 14 is guided and carried by suitable supports such as the bar 19 which extends transversely of, and is carried by the side frames 7 of the slicing machine. The cylindrical roller 17 is carried on a suitable shaft 20 journalled in the brackets 21 supported by the side frames 7 of the slicing machine. By rotating the roller 17 positioned beneath the discharge plate 12 the apron 14 will have its free edge 22 extended or retracted from the edge 15 of the discharge plate. Thus more or less of the loaf supporting portion 18 of the apron is extended over the conveyor 11 so that the loaves A will be deposited in a predeterminable position with respect to the flights 13.

In the event relatively large loaves such as the loaves A of Fig. 1 are being sliced and wrapped, the apron 14 would be considerably retracted with but a small portion of the loaf supporting part 18 extending beyond the edge 15 of the discharge plate 12. If smaller loaves, such as those represented by B of Fig. 4 are being sliced and wrapped, a proportionately larger amount of the loaf supporting portion 18 would be extended beyond the edge 15 of the discharge plate 12 so as to carry the loaves B well out over the infeed conveyor 11 and ahead of the flights 13.

In order that the loaf transferring apron 14 may be easily adjusted, an adjusting hand wheel 23 is keyed to an extension 24 of the shaft 20. The locking hand wheel 25 threadedly engages the extension 24 of the shaft 20 so that it may be tightened against the bracket 21 to lock the roller 17 and retain the apron 14 in an adjusted position.

In order to facilitate the transfer of the sliced loaves from the apron 14 to the conveyor 11, a plurality of guide springs 26 are provided. These springs are individually relatively weak so as not to injure the sliced article, but with a plurality of them engaging each end of the sliced article, there is a sufficient compacting effect to retain the sliced loaf intact and gently transfer it from the slicing machine to the conveyor 11.

It will be seen that the apron 14 may be unwound from the roller 17, or reeled in, thus extending it from or drawing it back toward the bread discharge plate 12 while the machine is in operation, permitting successive series of different sized sliced articles to be run uninterruptedly through the slicer and wrapping machine.

In adjusting the position of the apron 14 it is preferable to position it so that the loaf which is next in line to be deposited upon the conveyor 11 will project slightly beyond the free edge 22 of the apron in order that the loaf which was ahead of such loaf will positively be pushed off the loaf transfer apron 14 onto the conveyor 11 in such a manner that the oncoming flight 13 will not slide underneath the loaf coming from the apron but will positively engage and convey the same.

Although a single embodiment of the invention has been herein shown and described, it will be understood that numerous details of the construction shown may be altered or omitted without departing from the spirit of this invention as defined in the following claims.

What I claim is:

1. In a slicing machine an infeed conveyor for advancing articles to the slicing mechanism at uniform intervals, a discharge conveyor to convey sliced articles away from the slicing mechanism, a table positioned between the conveyors for supporting an article during a slicing operation, an apron supported over the discharge conveyor and beneath the discharge end of the table, and means for advancing and retracting the apron with respect to the table whereby the combined effective article supporting length of the table and apron may be increased or decreased to adjust the machine for articles of different size and time the discharge of sliced articles onto the discharge conveyor in synchronism with the feed intervals.

2. In a slicing machine an infeed conveyor for advancing articles to the slicing mechanism, a discharge conveyor to convey sliced articles away from the slicing mechanism, a table arranged to receive an article from the infeed conveyor and support said article as it advances to the discharge conveyor, an apron for varying the effective article supporting length of said table, and a rotatable roller for advancing and retracting the apron to adjust the combined article supporting length of the table and apron, whereby the transfer of articles from the table and apron to the discharge conveyor may be regulated.

3. In a slicing machine an infeed conveyor for advancing articles to the slicing mechanism, a discharge conveyor to convey sliced articles away from the slicing mechanism, a table arranged to receive an article from the infeed conveyor and support said article as it advances to the discharge conveyor, an apron for varying the effective article supporting length of said table, a rotatable roller for advancing and retracting the apron to adjust the combined article supporting length of the table and apron, whereby the transfer of articles from the table and apron to the discharge conveyor may be regulated, and means for locking the roller to hold the apron in adjusted position.

4. In a slicing machine an infeed conveyor for advancing articles to the slicing mechanism, a discharge conveyor to convey sliced articles away from the slicing mechanism, a table arranged to receive an article from the infeed conveyor and support said article as it advances to the discharge conveyor, an apron for varying the effective article supporting length of said table, a rotatable roller in engagement with the apron, a shaft for the roller supported by the slicing machine frame, a handwheel for rotating the shaft to advance and retract the apron to adjust the combined article supporting length of the table and apron, and a locking wheel to hold the roller in adjusted position.

5. An article discharge for a slicing machine comprising a conveyor having flights thereon, means between the slicing mechanism and conveyor for supporting sliced articles, said means having a free edge over which articles move to the conveyor before the conveyor flights are engageable with the articles to forward them over the conveyor, and means for moving the free edge toward and away from the slicing mechanism while maintaining a substantially continuous support for the articles from the slicing mechanism to said free edge to regulate the distance between said mechanism and the beginning of article forwarding movement by the conveyor flights.

6. An article discharge for a slicing machine comprising a conveyor having flights thereon, means between the slicing mechanism and conveyor for supporting sliced articles, said means supported independently of the conveyor and having a free edge over which articles move to the conveyor before the conveyor flights are engageable with the articles to forward them over the conveyor, and means for moving the free edge toward and away from the slicing mechanism while maintaining a substantially continuous support for the articles from the slicing mechanism to said free edge to regulate the distance between said mechanism and the beginning of article forwarding movement by the conveyor flights.

7. In a slicing machine a feed conveyor for advancing articles to the slicing mechanism, a discharge conveyor having flights thereon to conduct articles away from the slicing mechanism, means between the slicing mechanism and the discharge conveyor for supporting sliced articles, said means having a free edge over which articles move to the discharge conveyor before the conveyor flights are engageable with the articles to forward them over the conveyor and under which the flights of the discharge conveyor pass prior to article-conducting movement, and means for altering the effective length of the supporting means between the slicing mechanism and the free edge while maintaining a substantially continuous support for the articles from the slicing mechanism to said free edge thereby regulating the distance between said mechanism and the beginning of article-advancing movement of the discharge conveyor flights.

8. In a slicing machine a feed conveyor having flights thereon to advance articles to the slicing mechanism, a discharge conveyor operated in timed relation with the feed conveyor and having flights thereon to conduct articles away from the slicing mechanism, means between the slicing mechanism and the discharge conveyor for supporting sliced articles, said means having a free edge over which articles move to the discharge conveyor before the conveyor flights are engageable with the articles to forward them over the conveyor and under which the flights of the discharge conveyor pass prior to article-conducting movement, and means for altering the effective length of the supporting means between the slicing mechanism and the free edge while maintaining a substantially continuous support for the articles from the slicing mechanism to said free edge thereby regulating the distance between said mechanism and the beginning of article-advancing movement of the discharge conveyor flights.

9. In combination with a mechanism for individually operating on a succession of articles, an infeed conveyor having flights thereon for advancing articles to the mechanism, a discharge conveyor having flights thereon for conducting articles away from the mechanism, means for supporting the articles during said operation and extending in overlying relation with respect to the discharge conveyor, said means having an adjustable free edge over which articles move prior to being engaged by flights of the discharge conveyor, and means for moving the free edge toward and away from the mechanism while maintaining a substantially continuous support for the articles from the slicing mechanism to said free edge for varying the distance between said mechanism and the beginning of article-conducting movement of the article discharge conveyor flights.

10. In combination with a mechanism for operating on a succession of articles, a feed conveyor having flights thereon for individually advancing articles to the mechanism, a discharge conveyor having flights thereon for individually conducting articles away from the mechanism, means extending between the conveyors for supporting articles during said operation and arranged so that articles are advanced thereover in contacting relation with one another by the feed conveyor so that for each article moved onto the supporting means by the feed conveyor an article is moved off the supporting means onto the discharge conveyor, and means for varying the effective length of said supporting means while maintaining a substantially continuous support for the articles from end to end thereof to compensate for differences in length of support required when the size of articles operated on by the mechanism is altered.

11. In a slicing machine having a plurality of spaced movable cutters, a conveyor having flights thereon for forwarding sliced articles received from the slicing mechanism, means extending between the cutters for supporting an article during the slicing thereof, a member extending between the support means and the conveyor for sustaining sliced articles as they move from the cutters to the conveyor, said member having a free edge over which articles move to the conveyor before the conveyor flights are engageable with the articles to forward them over the conveyor, and means for moving the free edge of the member toward and away from the slicing mechanism while maintaining a substantially continuous support for articles from the cutters to said free edge and without moving the supporting means between the cutters to regulate the distance between said cutters and the position of an article, at which it is engaged by a flight of said conveyor, to be forwarded thereby.

12. In a machine having a slicing mechanism, feed means for advancing articles to the mechanism, discharge means operated in timed relation to the feed means for individually conducting sliced articles away from the mechanism, means between said mechanism and the discharge means for supporting sliced articles, said supporting means having an edge over which articles move to the discharge means before said discharge means is conductively engageable with the articles, and means for altering the effective length of the supporting means between the mechanism and said edge while maintaining a substantially continuous support for the articles from the mechanism to said edge thereby altering the distance between the mechanism and the position of the articles at which they are engaged by the discharge means.

CHARLES H. PETSKEYES.